(12) United States Patent
Hudson

(10) Patent No.: US 10,890,040 B2
(45) Date of Patent: Jan. 12, 2021

(54) ROTARY HEAD GUIDE SYSTEM FOR DRILLING MACHINE

(71) Applicant: Caterpillar Global Mining Equipment LLC, Denison, TX (US)

(72) Inventor: Charles Taylor Hudson, Sherman, TX (US)

(73) Assignee: Caterpillar Global Mining Equipment LLC, Denison, TX (US)

( * ) Notice: Subject to any disclaimer, the term of this patent is extended or adjusted under 35 U.S.C. 154(b) by 76 days.

(21) Appl. No.: 16/158,816

(22) Filed: Oct. 12, 2018

(65) Prior Publication Data

US 2020/0115974 A1    Apr. 16, 2020

(51) Int. Cl.
*E21B 19/24*    (2006.01)
*B23B 51/00*    (2006.01)
*E21B 15/00*    (2006.01)

(52) U.S. Cl.
CPC .......... *E21B 19/24* (2013.01); *B23B 51/0054* (2013.01); *E21B 15/00* (2013.01)

(58) Field of Classification Search
CPC ....................................................... E21B 19/24
USPC ......................................................... 175/220
See application file for complete search history.

(56) References Cited

U.S. PATENT DOCUMENTS

| 3,460,638 | A  | * | 8/1969 | Millsapps, Jr. | .......... E21B 19/20 175/85 |
| 5,501,287 | A  | * | 3/1996 | Loeser | ..................... E21B 17/07 175/173 |
| 6,672,410 | B2 | * | 1/2004 | Smith | ..................... E21B 19/084 175/122 |
| 6,796,388 | B2 | * | 9/2004 | O'Meley | .............. E21D 20/003 173/11 |
| 8,181,721 | B1 | * | 5/2012 | Keast | ...................... E21B 19/02 175/162 |
| 9,464,494 | B2 | * | 10/2016 | Marica | ..................... B61B 15/00 |
| 2008/0210416 | A1 | * | 9/2008 | Lesko | ..................... E21B 7/023 166/85.5 |

FOREIGN PATENT DOCUMENTS

| CN | 203655170 U | 6/2014 |
| CN | 204175193 U | 2/2015 |
| CN | 205532323 U | 8/2016 |
| CN | 106952424 A | 7/2017 |
| KR | 10-2016-0010047 A | 1/2016 |

* cited by examiner

*Primary Examiner* — Taras P Bemko
(74) *Attorney, Agent, or Firm* — Bookoff McAndrews

(57) ABSTRACT

A rotary head guide system for a mobile drilling machine is disclosed. The rotary head guide system may include a drilling mast including a mast frame having an opening along substantially an entire length of the mast frame. The mast frame may include edges forming flanges on each side of the opening. The flanges may extend along the length of the mast frame. Additionally, the rotary head guide system may include a rotary head movably coupled to the drilling mast by a support structure including at least two guide assemblies engaging the flanges.

17 Claims, 4 Drawing Sheets

ROTARY HEAD GUIDE SYSTEM FOR DRILLING MACHINE

TECHNICAL FIELD

The present disclosure relates generally to mobile drilling machines, and more particularly, rotary head guide systems for such machines.

BACKGROUND

Mobile drilling machines, such as blasthole drilling machines, are used for drilling blastholes for mining, quarrying, dam construction, and road construction, among other uses. The process of excavating rock, or other material, by blasthole drilling comprises using the blasthole drill machine to drill a plurality of holes into the rock and filling the holes with explosives. The explosives are detonated causing the rock to collapse and rubble of the collapse is then removed and the new surface that is formed is reinforced. Many current blasthole drilling machines utilize rotary drill rigs, mounted on a mast, that can drill blastholes anywhere from 6 inches to 22 inches in diameter and depths up to 180 feet or more.

The mast of blasthole drills may also support a rotary head, or motor, configured to rotate a drill pipe string such that a drill bit, attached to an end of the drill pipe string, is also rotated to form a blasthole. The rotary head may be mounted on a guide system configured to allow the rotary head to move up and down the drill mast during drilling operations. Guide systems may utilize a large number of wear pads for sliding up and down a track on the drill mast. Current guide systems for rotary heads may be large and heavy, and may require a large number of wear pads that may be difficult to adjust for wear.

Korean Publication No. KR20160010047, published on Jan. 27, 2016 ("the '047 publication"), describes a rotary head guide system for a boring machine. The guide system of the '047 publication includes triangular slide guides welded to the outer left and right sides of the mast body. The guide system of the '047 publication further includes a cradle that supports the rotary head. The cradle is slidable on the triangular slide guides to allow the rotary head to move along the mast body. The cradle of the '047 publication further includes guide members having inner surface shapes coinciding with an outer surface of the slide guides. Slide pads are replaceably mounted on the inner surface of the guide members to allow the guide members to slide along the slide guides. The guide members of the '047 publication are formed in a general V-shape to correspond to the triangular shape of the slide guides. The '047 publication is directed to a horizontal drill and thus the guide system addresses different forces and wear than a vertical drill, such as mobile blasthole drilling machine.

The present disclosure may solve one or more of the problems set forth above and/or other problems in the art. The scope of the current disclosure, however, is defined by the attached claims, and not by the ability to solve any specific problem.

SUMMARY

In one aspect, a rotary head guide system for a mobile drilling machine is disclosed. The rotary head guide system may comprise: a drilling mast including a mast frame having an opening along substantially an entire length of the mast frame, the mast frame including edges forming flanges on each side of the opening, the flanges extending along the length of the mast frame; and a rotary head movably coupled to the drilling mast by a support structure including at least two guide assemblies engaging the flanges.

In another aspect, a rotary head guide system for a mobile drilling machine is disclosed. The rotary head guide system may comprise: a rotary head support structure movably coupled to flanges of a drilling mast frame, the support structure including: a pair of guide assemblies slidable on the flanges, each guide assembly including a first bracket and a second bracket having wear members positioned generally parallel to one another.

In yet another aspect, rotary head guide system for a mobile blasthole drilling machine, comprising: a rotary head support structure movably coupled to flanges of a drilling mast frame, the support structure including: a pair of guide assemblies slidable on the flanges, each guide assembly including a first bracket and a second bracket having wear members positioned generally parallel to one another, wherein the second bracket of each guide assembly is adjustable with respect to the first bracket to reduce a gap between the wear members, and wherein the first and second brackets include a proximal portion coupled to the one or more base plates, and an angled distal portion, the angled distal portion being at an angle between 120°-150° with respect to the proximal portion.

BRIEF DESCRIPTION OF THE DRAWINGS

The accompanying drawings, which are incorporated in and constitute a part of this specification, illustrate various exemplary embodiments and together with the description, serve to explain the principles of the disclosure.

DETAILED DESCRIPTION

Both the foregoing general description and the following detailed description are exemplary and explanatory only and are not restrictive of the features, as claimed. As used herein, the terms "comprises," "comprising," "having," including," or other variations thereof, are intended to cover a non-exclusive inclusion such that a process, method, article, or apparatus that comprises a list of elements does not include only those elements, but may include other elements not expressly listed or inherent to such a process, method, article, or apparatus. Further, unless noted otherwise, relative terms, such as, for example, "about," "substantially," "generally," and "approximately" are used to indicate a possible variation of ±10% in a stated value.

Figure 1:
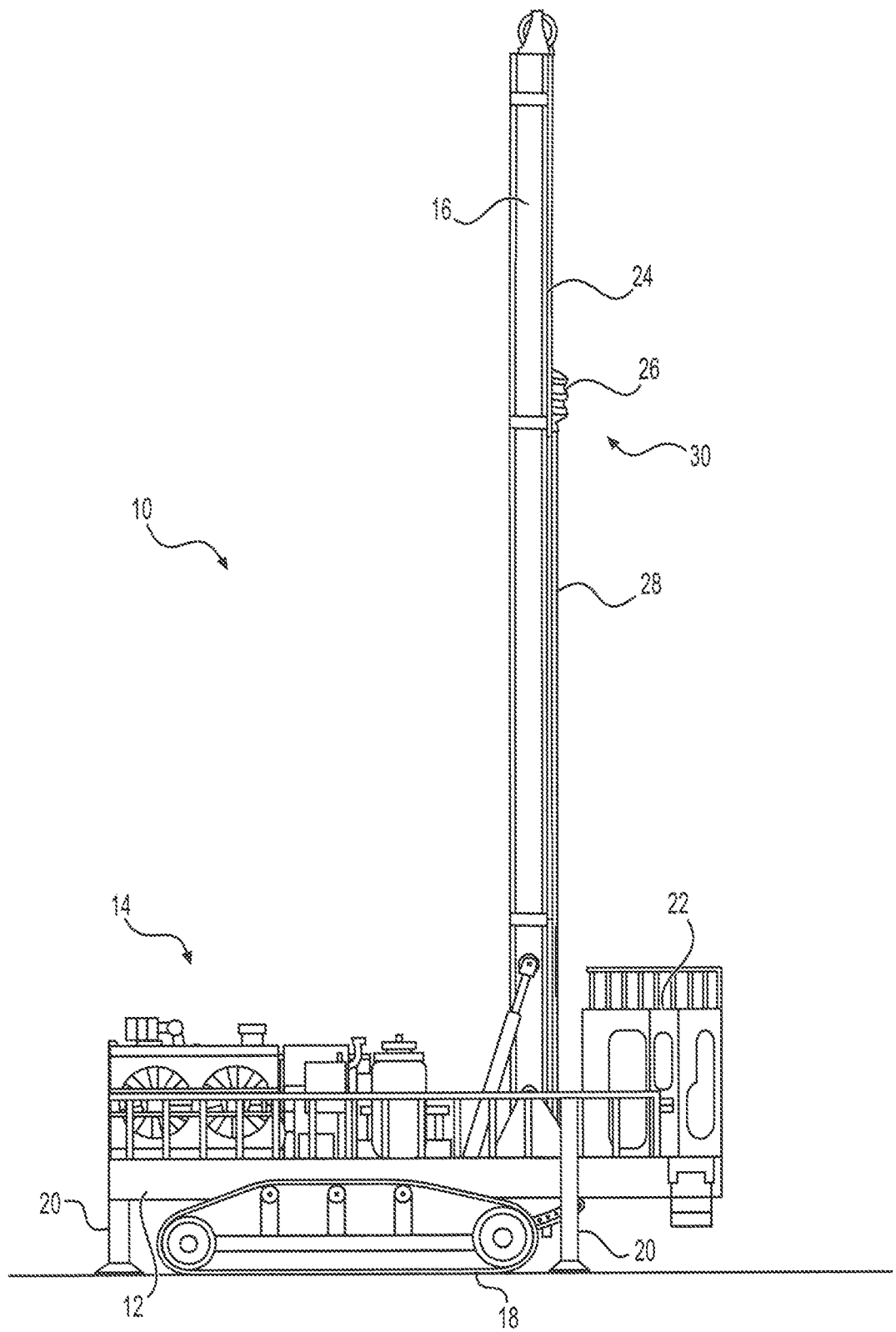
FIG. 1 illustrates a side view of a mobile drilling machine having a rotary head guide system according to aspects of the disclosure.

FIG. 1 illustrates a side view of a mobile drilling machine 10, such as a blasthole drilling machine, having a rotary head guide system 30, according to aspects of the disclosure. As shown in FIG. 1, mobile drilling machine 10 may include a frame 12, machinery 14, and a drilling mast 16. Frame 12 may be supported on a ground surface by a transport mechanism, such as crawler tracks 18. Crawler tracks 18 may allow mobile drilling machine 10 to maneuver about the ground surface to a desired location for a drilling operation. Frame 12 may further include one or more jacks 20 for supporting and leveling mobile drilling machine 10 on the ground surface during the drilling operation. Frame 12 may support the machinery 14, which may include engines, motors, batteries, pumps, air compressors, and/or any other equipment necessary to power and operate mobile drilling machine 10. Frame 12 may further support an operator cab 22, from which an operator may maneuver and control mobile drilling machine 10.

As further shown in FIG. 1, drilling mast 16 may include a mast frame 24 which may support a rotary head 26. Rotary head 26 may couple to, and rotate, a drill string 28 of drilling pipe segments on which a drill bit (not shown) is mounted for drilling into the ground surface. Rotary head 26 may be configured to move up and down mast frame 24 by a rotary head guide system 30, as further described below.

Figure 2:
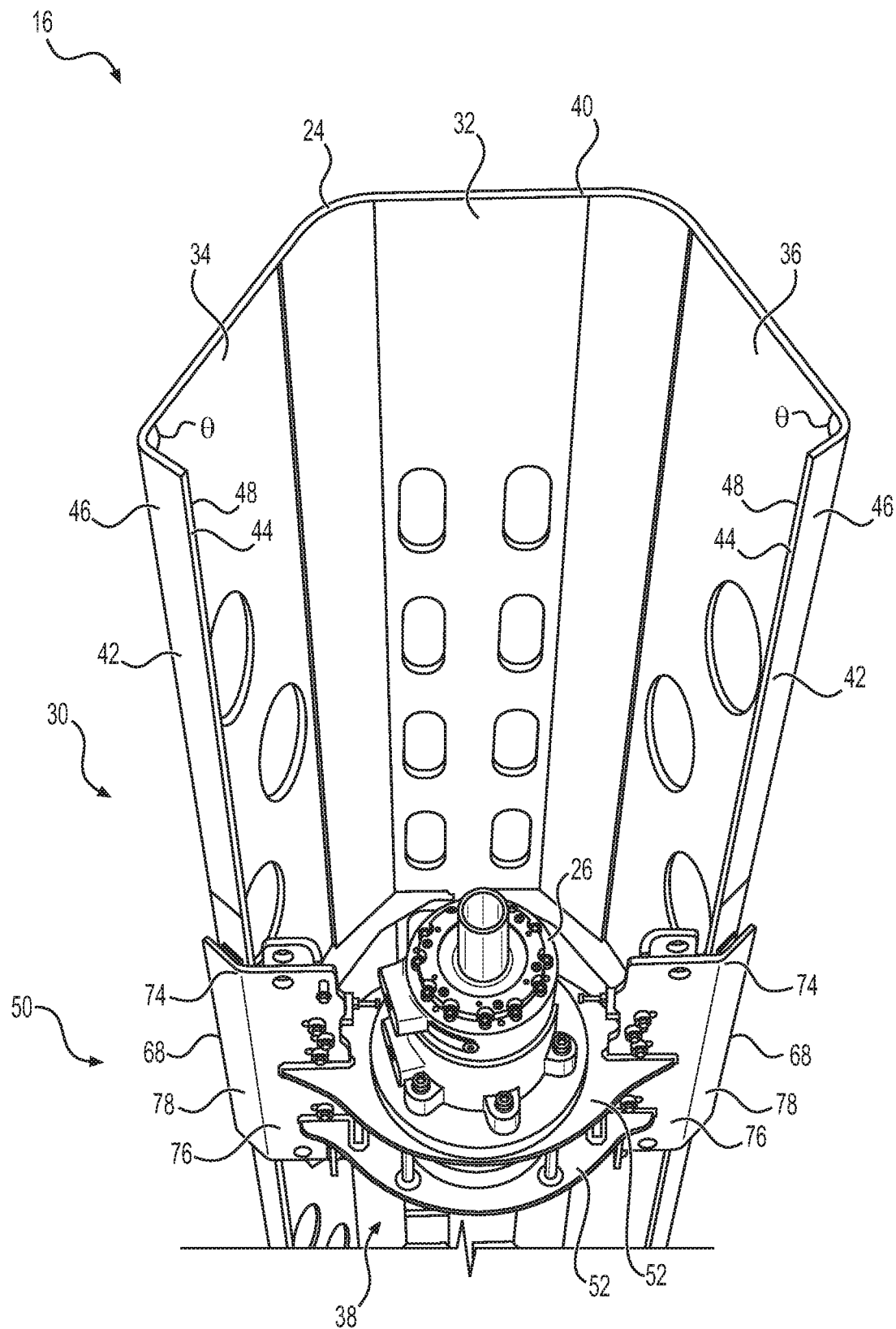
FIG. 2 illustrates a perspective top view showing an exemplary rotary head guide system of the mobile drilling machine of FIG. 1.

FIG. 2 illustrates a perspective top view of an exemplary rotary head guide system 30 of the mobile drilling machine 10. As shown in FIG. 2, mast frame 24 may include a back 32, a first side 34, and a second side 36. The first side 34 and the second side 36 may diverge from the back 32 to form an opening 38 at a front side of mast frame 24 that may have a larger width than the back 32. The first side 34 and the second side 36 may each extend at obtuse angles from an interior surface of the back 32 of mast frame 24. However, the first side 34 and the second side 36 may also extend at a different angle, for example, perpendicular to the back 32, such that the opening 38 may have the same width as the back 32. In addition, mast frame 24 may be curved, such that the back 32, the first side 34, and the second side 36 form parts of a curve. As such, mast frame 24 may be characterized as generally C-shaped inasmuch as the shape of mast frame 24 is similar to and resembles the letter "C." Further, the opening 38 may be open along substantially an entire length of the mast frame 24 from a top end to a bottom end.

The back 32, the first side 34, and the second side 36 of mast frame 24 may be formed by one or more plates 40. As such, the one or more plates 40 may form a shape of mast frame 24. The one or more plates 40 may include a plurality of plates 40 that may extend substantially an entire length of the mast frame 24. The one or more plates 40 may comprise any lightweight material, such as sheet metal or the like.

As further shown in FIG. 2, mast frame 24 may include flanges 42 at the opening 38. As such, mast frame 24 may include edges 44 that form the flanges 42 on each side of the opening 38. The one or more plates 40 of mast frame 24 may form the flanges 42, such that the flanges 42 may extend along an entire length of mast frame 24. The flanges 42 may include a first surface 46 on an outside of mast frame 24 and a second surface 48 on an inside of mast frame 24. Each flange 42 may extend at an angle θ with respect to an adjacent portion (i.e., the first side 34 or the second side 36) of mast frame 24, measured from inside mast frame 24. In the exemplary embodiment, the angle θ may be approximately forty-five degrees (45°). However, the flanges 42 may alternatively extend at an angle θ between approximately thirty degrees (30°) and approximately sixty degrees (60°).

Rotary head guide system 30 may include a support structure 50 for supporting rotary head 26. Rotary head 26 may be driven up and down along a length of the mast frame 24 by the rotary head guide system 30. As such, support structure 50 may be slidably attached to the flanges 42 of mast frame 24, such that the flanges 42 may provide runners for the support structure 50, as further described below. Support structure 50 may further be attached to a cable and pulley system (not shown) in order to move the support structure 50 up and down along the length of the mast frame 24.

Figure 3A:
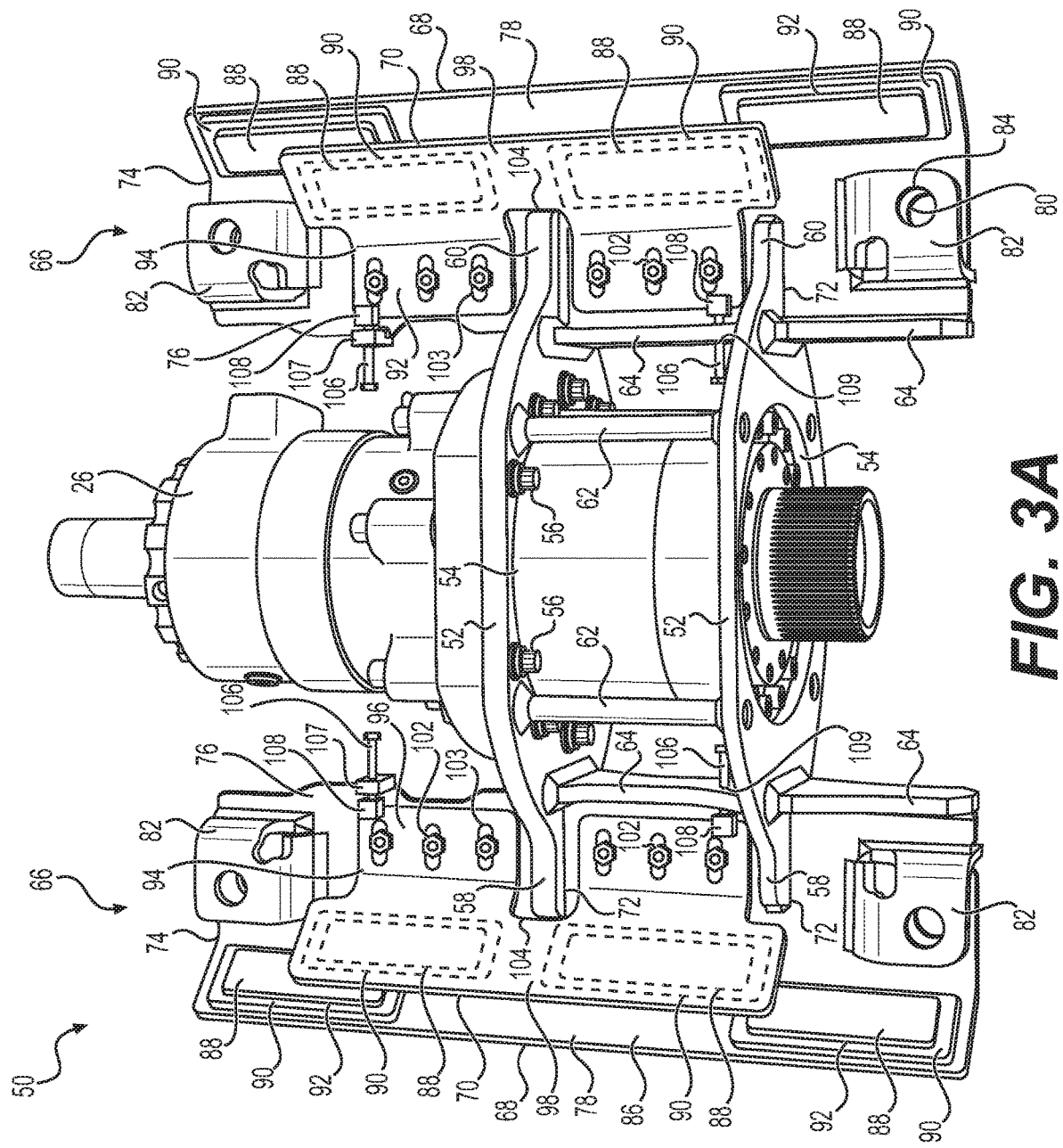
FIGS. 3A and 3B illustrate a rear view and a perspective side view, respectively, of a rotary head and the rotary head guide system isolated from the mobile drilling machine of FIG. 1.
Figure 3B:
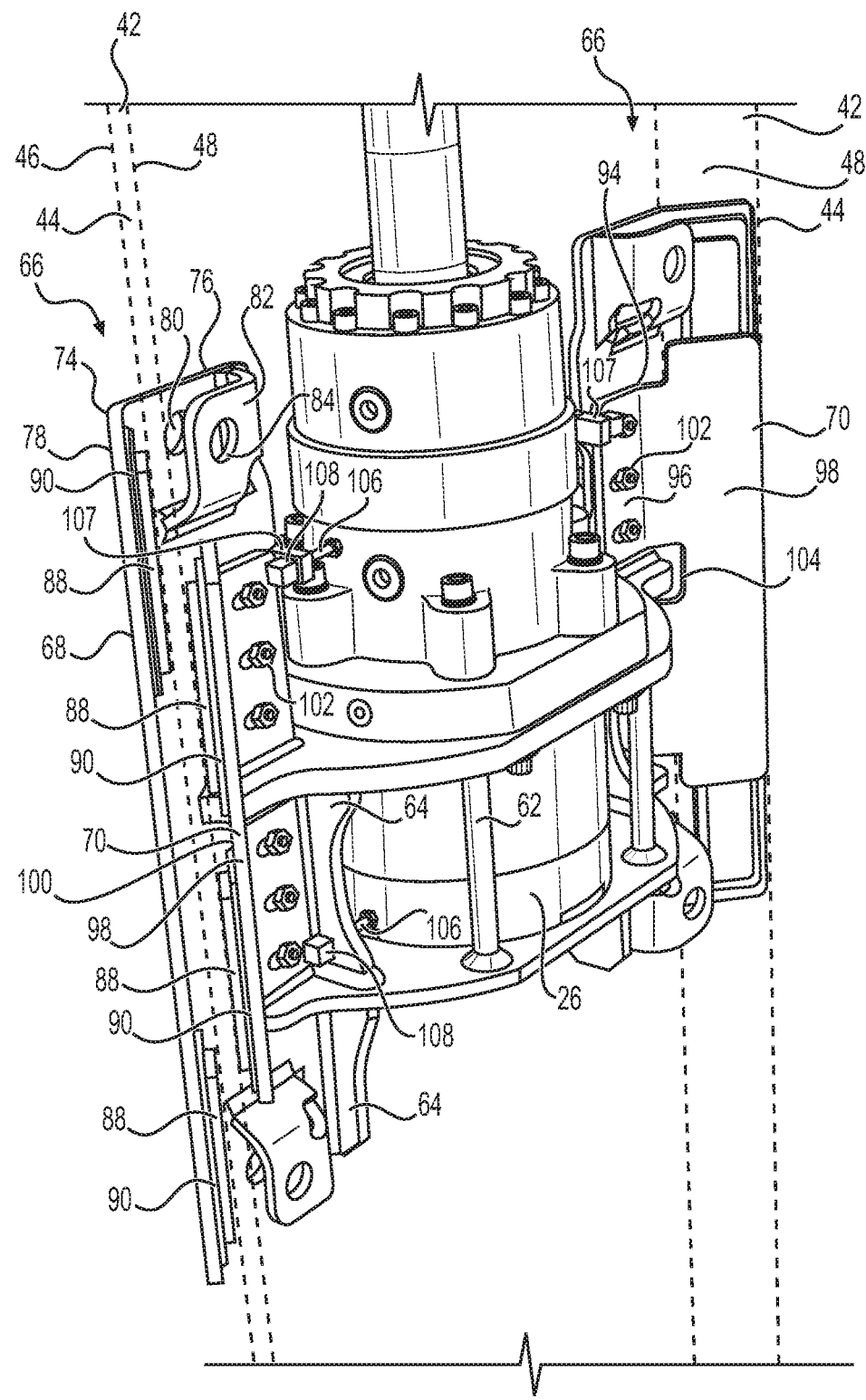

FIGS. 3A and 3B illustrate a rear view and a side view, respectively, of the rotary head 26 and of the support structure 50 of the rotary head guide system 30, isolated from the mobile drilling machine 10. As shown in FIGS. 3A and 3B, support structure 50 may include one or more base plates 52. The one or more base plates 52 may each have a hole 54 configured to receive the rotary head 26. The one or more base plates 52 may include a shape configured to provide support for the rotary head 26 when the rotary head 26 is coupled to the one or more base plates 52. As such, the one or more base plates 52 may be generally circular shaped corresponding to a generally circular shape of the rotary head 26. However, the one or more base plates 52 may be any shape as necessary, configured to support rotary head 26. Rotary head 26 may be removably coupled and secured to the one or more base plates 52 by one or more removable fasteners 56. Removable fasteners 56 may be any suitable removable fastener, such as a threaded bolt or the like. The one or more base plates 52 may each further include a first arm 58 and a second arm 60. The first arm 58 and the second arm 60 of each base plate 52 may be on opposite lateral sides of each respective base plate 52. The first arm 58 and the second arm 60 of each base plate 52 may be configured to be coupled with a respective guide assembly 66, as further described below. In the exemplary embodiment, the one or more base plates 52 may include two such base plates 52. However, any number of base plates 52 may be used as necessary to provide support for rotary head 26.

The one or more base plates 52 may be coupled to one another by one or more support members 62 and/or one or more support plates 64. The one or more support members 62 may be rods or the like, and may include four such support members 62. Each support member 62 may be welded or otherwise coupled to the one or more base plates 52 and may be located between the one or more base plates 52. Likewise, the one or more support plates 64 may be welded or otherwise coupled to the one or more base plates 52. The one or more support plates 64 may be located at outer ends of the one or more base plates 52, adjacent the first arm 58 and the second arm 60, respectively, such that the guide assemblies 66 may also be welded or otherwise coupled to the one or more support plates 64, as further described below. In the exemplary embodiment, the one or more support plates 64 may include four support plates 64, such that two support plates 64 may be coupled between the one or more base plates 52 and two support plates 64 may be coupled to a bottom surface of a bottom-most base plate 52. It is understood that any number and arrangement of support members 62 and support plates 64 may be used as necessary. The one or more base plates 52, one or more support members 62, one or more support plates 64, and guide assemblies 66 may be made of metal, such as steel or the like.

As further shown in FIGS. 3A and 3B, support structure 50 may include at least two guide assemblies 66 for engaging the respective flanges 42 of mast frame 24 (shown as a dashed line in FIG. 3B for clarity). In the exemplary embodiment, the at least two guide assemblies 66 may include a pair of guide assemblies 66. Each guide assembly 66 may include a first bracket 68 and a second bracket 70. With reference to FIG. 2, the first bracket 68 of each guide assembly 66 may be welded or otherwise coupled to the one or more base plates 52. The first bracket 68 of each guide assembly 66 may include one or more cutouts 72 corresponding to the first arm 58 and the second arm 60, respectively, of the one or more base plates 52. As such, the first bracket 68 of a first guide assembly 66 may be coupled to the first arm 58 of each base plate 52 and the first bracket 68 of a second guide assembly 66 may be coupled to the second arm 60 of each base plate 52. Each first bracket 68 may further be welded or otherwise coupled to the one or more support plates 64 to provide additional support for each first bracket 68.

The first bracket 68 of each guide assembly 66 may include a bend 74 such that the first bracket 68 may include a first portion 76, or proximal portion, and a second portion 78, or angled distal portion. The first portion 76, or proximal portion, may be aligned perpendicular to the one or more base plates 52 such that the first portion 76 of each first bracket 68 extends outwards from the first arm 58 and the second arm 60, respectively, of the one or more base plates 52. The first portion 76 of each first bracket 68 may include one or more holes 80 for receiving an end of a cable of the cable and pulley system. In the exemplary embodiment, the first portion 76 of each first bracket 68 may include two holes 80, such that a first hole 80 may be located at a top portion of first bracket 68 and a second hole 80 may be located at a bottom portion of first bracket 68. The first portion 76 of each first bracket 68 may further include one or more cable mount brackets 82. Each cable mount bracket 82 may include a hole 84 for receiving an end of a cable of the cable and pulley system. As such, the one or more cable mount brackets 82 may be welded or otherwise coupled to an inside surface of the first portion 76 of each bracket 68, such that the hole 84 of each cable mount bracket 82 may be aligned with a corresponding hole 80 of the first portion 76 of each first bracket 68.

The second portion 78, or angled distal portion, of each first bracket 68 may be angled from the first portion 76 at the bend 74. The angle of the second portion 78 with respect to the first portion 76 may correspond to the angle θ of the flanges 42 of mast frame 24 such that the second portion 78 of the first bracket 68 may include an inside surface 86 generally parallel to a first surface 46 of the flanges 42. Thus, the second portion 78 of each first bracket 68 may be configured to engage the flanges 42. For example, the second portion 78 of the first bracket 68 may extend from the first portion 76 of the first bracket 68 at approximately a one hundred and thirty-five degree angle (135°), measured from inside the first bracket 68. However, the second portion 78 may extend from the first portion 76 at any angle between approximately one hundred and twenty degrees (120°) and approximately one hundred and fifty degrees (150°), corresponding to the angle θ of the flanges 42 of mast frame 24.

The first bracket 68 of each guide assembly 66 may further include one or more wear members 88, or wear pads. For example, the one or more wear members 88 may include two wear members 88, the wear members 88 may be generally rectangular in shape as shown, and may be made of any suitable wear material, such as nylon or the like. The one or more wear members 88 of the first bracket 68 may be coupled to the inside surface 86 of the second portion 78. As such, the one or more wear members 88 may be aligned generally parallel to the first surface 46 of a respective flange 42. The one or more wear members 88 of the first bracket 68 may be removably coupled to respective one or more mount plates 90. The one or more mount plates 90 may be welded or otherwise coupled to the inside surface 86 of the second portion 78 of the first bracket 68. The one or more mount plates 90 may include a cutout 92 corresponding to a size and shape of the respective one or more wear members 88.

As such, the cutout 92 of each mount plate 90 may be configured to receive a respective wear member 88. In the exemplary embodiment, each first bracket 68 may include two such wear members 88 for engaging the first surface 46 of a respective flange 42. It is understood, however, that any number of wear members may be used on first bracket 68, and the wear members may be of a different size and shape as that shown in FIG. 3A.

The second bracket 70 of each guide assembly 66 may be removably coupled to the first bracket 68. The second bracket 70 may be smaller in size than the first bracket 68. However, the first bracket 68 and the second bracket 70 may be any size, as necessary. The second bracket 70 of each guide assembly 66 may include a bend 94 such that the second bracket 70 may include a first portion 96, or proximal portion, and a second portion 98, or angled distal portion. The first portion 96, or proximal portion, of each second bracket 70 may be coupled to an inside surface 100 of the first portion 76 of the first bracket 68 by one or more removable fasteners 102, such as threaded bolts or the like. The first portion 96 of each second bracket 70 may further include cutouts 104 corresponding to the first arm 58 and second arm 60 of each base plate 52. As such, the first portion 96 of each second bracket 70 may be configured to fit around the first arm 58 and second arm 60 of each base plate 52 without contacting the first arm 58 or second arm 60 when the second bracket 70 is coupled to the first bracket 68.

The second portion 98, or angled distal portion, of each second bracket 70 may be angled from the first portion 96 at the bend 94. The angle of the second portion 96 with respect to the first portion 96 may correspond to the angle θ of the flanges 42 of mast frame 24 such that the second portion 96 of the second bracket 70 may include an inside surface 100 generally parallel to a second surface 48 of the flanges 42. Thus, the second portion 98 of each second bracket 70 may be configured to engage the flanges 42. For example, the second portion 98 of the second bracket 70 may extend from the first portion 96 at approximately a one hundred and thirty-five degree angle (135°), measured from inside the second bracket 70. However, the second portion 98 may alternatively extend from the first portion 96 at an angle between approximately one hundred and twenty degrees (120°) and approximately one hundred and fifty degrees (150°), corresponding to the angle θ of the flanges 42 of mast frame 24.

The second bracket 70 of each guide assembly 66 may further include one or more wear members 88, or wear pads. For example, the one or more wear members 88 may include two wear members 88, the wear members 88 may be generally rectangular in shape as shown, and may be made of any suitable material, such as nylon or the like. The one or more wear members 88 of the second bracket 70 may be coupled to the inside surface 100 of the second portion 98. As such, the one or more wear members 88 may engage, and be aligned generally parallel to, the second surface 48 of a respective flange 42. The one or more wear members 88 of the second bracket 70 may also be aligned generally parallel to corresponding wear members 88 of the first bracket 68. In the exemplary embodiment, the one or more wear members 88 of the second bracket 70 may be aligned and vertically offset with respect to the one or more wear members 88 of the first bracket 68 such that the one or more wear members 88 of the second bracket 70 include portions located with a vertical gap between the one or more wear members 88 of the first bracket 68, and the one or more wear members 88 of the second bracket 70 are located with the vertical extremes of the one or more wear members 88 of the first bracket 68. However, the one or more wear members 88 of the first bracket 68 and the second bracket 68 may be vertically aligned in different configurations. The one or more wear members 88 of the second bracket 70 may be removably coupled to respective one or more mount plates 90. The one or more mount plates 90 may be welded or otherwise coupled to the inside surface 100 of the second portion 98 of the second bracket 70. The one or more mount plates 90 may include a cutout 92 corresponding to a size and shape of the respective one or more wear members 88. As such, the cutout 92 of each mount plate 90 may be configured to receive a respective wear member 88. In the exemplary embodiment, each second bracket 70 may include two such wear members 88 for engaging the second surface 48 of a respective flange 42.

The second bracket 70 of each guide assembly 66 may further be adjustable with respect to the first bracket 68, such that the wear members 88 may be adjusted with respect to the flanges 42. For example, the one or more removable fasteners 102 of the second bracket 70 may be loosened to allow for the second bracket 70 to slide towards or away from a respective flange 42. As such, the first portion 96 of second bracket 70 may include grooves 103 in which the one or more removable fasteners 102 may be inserted to secure second bracket 70 to first bracket 68. Each groove 103 may be sized to allow for the second bracket 70 to slide towards or away from the respective flange 42 and around the one or more removable fasteners 102. The grooves 103 may further be sized such that the one or more removable fasteners 102 may secure the second bracket 70 to the first bracket 68 without moving when the one or more removable fasteners 102 are fully tightened.

After the one or more removable fasteners 102 have been loosened, the respective second bracket 70 may be adjusted by one or more adjusting mechanisms 106. The one or more adjusting mechanisms 106 may be any suitable adjusting mechanism, such as a threaded bolt or the like. The one or more adjusting mechanisms 106 may be coupled to the first portion 96 of each first bracket 68 by a respective mount block 107 that may be welded or otherwise coupled to the respective first portion 96. Alternatively, or additionally, the one or more adjusting mechanisms 106 may be threaded through a threaded hole 109 of the one or more support plates 64. An adjusting block or tab 108 may be included on the second bracket 70 to receive the adjusting mechanism 106. In the exemplary embodiment, the one or more adjusting mechanisms 106 may include four such adjusting mechanisms 106, such that a pair of adjusting mechanisms 106 may be arranged adjacent a top end and a bottom end, respectively, of the first portion 96 of each second bracket 70. Each adjusting mechanism 106 may selectively contact the adjusting block 108 of second bracket 70 such that the second bracket 70 may be urged towards a respective flange 42 as the adjusting mechanism 106 is adjusted. For example, when the adjusting mechanism 106 is a threaded bolt, the threaded bolt may be tightened such that an end of the threaded bolt contacts and pushes the adjusting block 108 of second bracket 70. Thus, as the wear members 88 of the first bracket 68 or second bracket 70 wear down due to friction, the respective second bracket 70 may be adjusted towards the respective flange 42. Therefore, the guide assemblies 66 of support structure 50 may be configured to maintain a proper fit between the guide assemblies 66 and the flanges 42, such that the support structure 50 may be maintained at a level and straight configuration.

INDUSTRIAL APPLICABILITY

The disclosed aspects of the rotary head guide system 30 may be used by any mobile drilling machine 10 having a support structure 50 for moving a rotary head 26 up and down a mast frame 24 of the mobile drilling machine 10. Referring to FIGS. 2 and 3B, rotary head guide system 30 may include support structure 50 mounted on the flanges 42 of mast frame 24. Support structure 50 may be configured to slide up and down mast frame 24 on the flanges 42. As such, rotary head 26 may move up and down mast frame 24 during a drilling operation.

The guide assemblies 66 of support structure 50 may each include a first bracket 68 and a second bracket 70. The first bracket 68 of each guide assembly 66 may be slidably mounted on a first surface 46 of a respective flange 42 and the second bracket 70 may be slidably mounted on a second surface 48 of the respective flange 42. Thus, the rotary head guide system 30 of the present disclosure may include only two friction surfaces for each guide assembly 66. Further, the friction surfaces are parallel to one another. Therefore, the rotary head guide system 30 may require fewer wear members 88 than prior art guide systems.

Additionally, the second bracket 70 of each guide assembly 66 may be adjustable with respect to the first bracket 68. As any of the one or more wear members 88 begin to wear down, the second bracket 70 may be adjusted to allow for the support structure 50 to maintain a clamped and level configuration. The one or more wear members 88 may also be replaced as necessary. Thus, even as the one or more wear members 88 wear down, the support structure 50 may be prevented from being uneven during movement of the support structure 50. Further, the angle of the flanges 42 may facilitate consistent movement of the support structure 50.

It will be apparent to those skilled in the art that various modifications and variations can be made to the disclosed system without departing from the scope of the disclosure. Other embodiments of the disclosure will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A rotary head guide system for a mobile drilling machine, comprising:
    a drilling mast including a mast frame having an opening along substantially an entire length of the mast frame, the mast frame including edges forming flanges on each side of the opening, the flanges forming a part of the mast frame and extending along the length of the mast frame; and
    a rotary head movably coupled to the drilling mast by a support structure including at least two guide assemblies engaging the flanges of the mast frame, the guide assemblies each include a first bracket and a second bracket slidable on respective flanges,
        wherein the first bracket slides on a first side of a respective flange and second bracket slides on a second side of the respective flange opposite of the first side of the flange.

2. The rotary head guide system of claim 1, wherein the mast frame includes one or more plates forming a shape of the mast frame, the one or more plates further forming the flanges.

3. The rotary head guide system of claim 1, wherein the flanges of the mast frame extend at an angle with respect to an adjacent portion of the mast frame, the angle being between 30°-60° measured from inside the mast frame.

4. The rotary head guide system of claim 1, wherein the first bracket and second bracket include an angled portion corresponding to the angle of the flanges such that the first bracket and the second bracket include surfaces generally parallel to the flanges.

5. The rotary head guide system of claim 1, wherein the first bracket includes one or more wear members slidable on the first side of a respective flange, and
   wherein the second bracket includes one or more wear members slidable on the second side of the respective flange.

6. The rotary head guide system of claim 1, wherein the first bracket and the second bracket are coupled to one another.

7. The rotary head guide system of claim 6, wherein the second bracket of each guide assembly is adjustable with respect to the first bracket to move toward or away from the first bracket.

8. The rotary head guide system of claim 1, wherein the support structure further includes one or more base plates coupled to the rotary head, the one or more base plates coupled to the guide assemblies.

9. A rotary head guide system for a mobile drilling machine, comprising:
   a rotary head support structure movably coupled to flanges that form a part of a drilling mast frame, the support structure including:
      a pair of guide assemblies slidable on the flanges of the drilling mast frame, each guide assembly including a first bracket and a second bracket having wear members positioned generally parallel to one another,
         wherein the first and second brackets include a proximal portion coupled to one or more base plates, and an angled distal portion, the angled distal portion being at an angle between 120°-150° with respect to the proximal portion.

10. The rotary head guide system of claim 9, wherein the first bracket and the second bracket are coupled to one another.

11. The rotary head guide system of claim 9, wherein the second bracket of each guide assembly is adjustable with respect to the first bracket to reduce a gap between the wear members.

12. The rotary head guide system of claim 9, wherein the wear members are located on the angled distal portion.

13. The rotary head guide system of claim 12, wherein the support structure includes only two guide assemblies and only two brackets on each guide assembly.

14. A rotary head guide system for a mobile blasthole drilling machine, comprising:
   a rotary head support structure movably coupled to flanges of a drilling mast frame, the support structure including:
      a pair of guide assemblies slidable on the flanges, each guide assembly including a first bracket and a second bracket having wear members positioned generally parallel to one another,
         wherein the second bracket of each guide assembly is adjustable with respect to the first bracket to reduce a gap between the wear members, and
         wherein the first and second brackets include a proximal portion coupled to the one or more base plates, and an angled distal portion, the angled distal portion being at an angle between 120°-150° with respect to the proximal portion.

15. The rotary head guide system of claim 14, wherein the first bracket and the second bracket are coupled to one another.

16. The rotary head guide system of claim 14, wherein the wear members are located on the angled distal portion.

17. The rotary head guide system of claim 16, wherein the support structure includes only two guide assemblies and only two brackets on each guide assembly.

\* \* \* \* \*